UNITED STATES PATENT OFFICE.

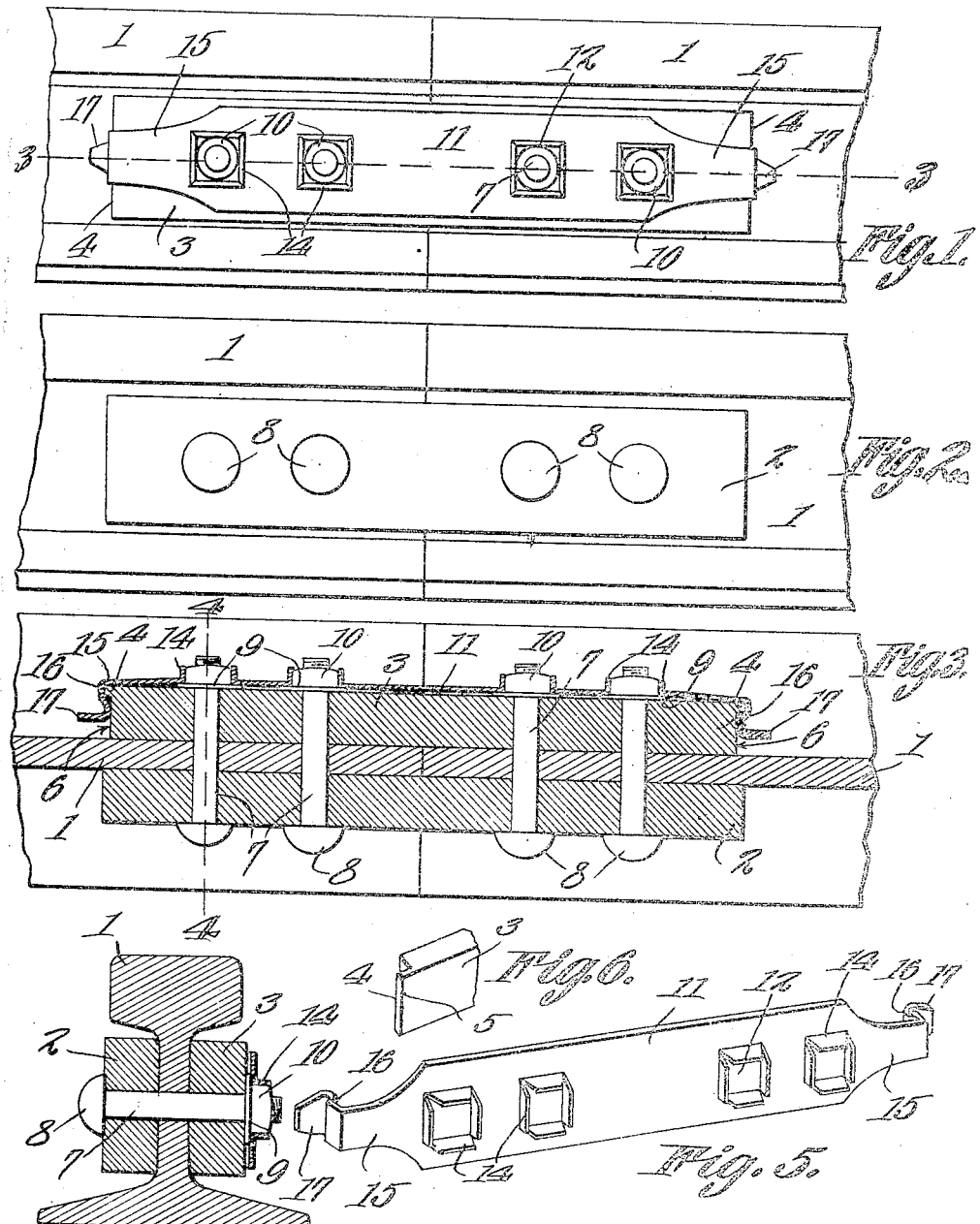

ROLLIE A. JACKSON, OF OWENSBORO, KENTUCKY.

LOCK-NUT PLATE.

1,125,545.   Specification of Letters Patent.   Patented Jan. 19, 1915.

Application filed September 3, 1914. Serial No. 860,685.

*To all whom it may concern:*

Be it known that I, ROLLIE A. JACKSON, a citizen of the United States, residing at Owensboro, in the county of Daviess and State of Kentucky, have invented a new and useful Lock-Nut Plate, of which the following is a specification.

The device forming the subject matter of this application is a nut lock and one object of the present invention is to provide novel means for interlocking the ends of a nut holding plate with a brace through which the bolt passes, novel means being provided whereby at the will of an operator, the interlocking engagement between the ends of the nut holding plate and the brace may be broken through the medium of finger pieces which project from the ends of the nut holding plate.

It is within the scope of the invention to improve generally and to enhance the utility of, devices of that type to which the present invention appertains.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings:—Figure 1 shows the invention in side elevation; Fig. 2 is an elevation depicting the opposite side of the structure from that shown in Fig. 1; Fig. 3 is a longitudinal section on the line 3—3 of Fig. 1; Fig. 4 is a cross section on the line 4—4 of Fig. 3; Fig. 5 is a perspective view showing the locking plate; and Fig. 6 is a fragmental perspective showing one end of one of the fish plates or braces.

The device forming the subject matter of this application is of that general type shown in Patents No. 655,022, and No. 1,056,605. The invention aims to improve the means whereby the nut locking plate is assembled with the ends of the fish plate or brace.

In the drawings, a pair of abutting rail sections is shown and denoted by the numeral 1. Applied to one side of the rail sections 1 is a brace or fish plate 2. Applied to the opposite faces of the rail sections 1 is a brace or fish plate 3. The fish plate 3 is provided at its ends with flanges extended the full width of the brace or fish plate, as shown at 5 in Fig. 6. The flanges 4 are spaced throughout their entire extent from the adjacent face of the rail as indicated at 6 in Fig. 7. Bolts 7 pass through the braces or fish plates 2 and 3, and through the rail sections 1. The heads 8 of the bolts 7 engage the fish plate 2. Washers 9 surround the bolts 7 and lie against the fish plate 3. Nuts 10, representing the rotatable elements of the nut and bolt structures, are threaded onto the bolts 7 and bear against the washers 9.

The invention includes a straight plate 11 provided with polygonal openings 12 which receive the nuts 10 and hold the latter against rotation. Above the openings 12 the plate 11 is equipped with ears 14 adapted to engage the edges of the nuts 10. The plate 11 is reduced in width at its ends to form resilient tongues 15, the tongues 15 being bent into sigmoidal shape to form shoulders 16 which lock behind the flanges 4, and to form projecting finger pieces 17 extended beyond the ends of the brace 3 and lying upon the same side of the rail as the brace 3.

Owing to the provision of the finger pieces 17, the shoulders 16 may be swung readily out of engagement with the flanges 4. Because the washers 9 are interposed between the plate 11 and the adjacent face of the fish plate or brace 3, the shoulders 16 on the plate 11 are held in engagement with the flanges 4 on the brace 3, this detail being clearly discernible from an inspection of Fig. 3.

In claiming the invention, the word "rail" is not to be construed as meaning, of necessity, a railroad rail, the invention being applicable for use upon structures other than railroad rails.

Having thus described the invention, what is claimed is:—

1. In a nut lock, a rail; a brace applied to the rail and provided at its ends with flanges extending the full width of the brace and spaced throughout their entire extent from the rail; a bolt and nut structure extended through the rail and the brace and including a polygonal rotatable element; a plate fitting against the brace and provided with a polygonal opening receiving and securing the polygonal element of the bolt and nut structure against rotation, the plate being provided at its ends with resilient tongues bent into sigmoidal shape to form shoulders which lock behind the flanges and to provide free-ended projecting finger pieces extended beyond the ends of the brace and lying upon the same side of the rail as the brace, the finger pieces constituting means whereby the ends of the plate may be sprung to break the engagement between the shoulders and the flanges.

2. In a nut lock, a rail; a brace applied to the rail and provided at its ends with flanges extending the full width of the brace and spaced throughout their entire extent from the rail; a bolt and nut structure extended through the rail and the brace and including a polygonal rotatable element; a plate fitting against the brace and provided with a polygonal opening receiving and securing polygonal element of the bolt and nut structure against rotation, the plate being provided at its ends with resilient tongues bent into sigmoidal shape to form shoulders which lock behind the flanges and to provide projecting finger pieces extended beyond the ends of the brace and lying upon the same side of the rail as the brace; and washers surrounding the bolts, the washers being interposed between the plate and the brace and constituting means for holding the shoulders on the plate interlocked with the flanges on the brace.

In testimony that I claim the foregoing as my own, I have hereto affixed my signature in the presence of two witnesses.

ROLLIE A. JACKSON.

Witnesses:
D. HAYNES,
D. L. RHODES.